United States Patent
Hamamoto

(10) Patent No.: US 6,661,960 B2
(45) Date of Patent: *Dec. 9, 2003

(54) SEMICONDUCTOR WAVEGUIDE PHOTODETECTOR

(75) Inventor: Kiichi Hamamoto, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,527

(22) Filed: Aug. 18, 1998

(65) Prior Publication Data

US 2001/0021299 A1 Sep. 13, 2001

(30) Foreign Application Priority Data

Aug. 18, 1997 (JP) .............................. 9-221423

(51) Int. Cl.$^7$ ................................. G02B 6/10
(52) U.S. Cl. ............................ 385/131; 385/12; 385/28
(58) Field of Search ........................... 385/12, 15–16, 385/23, 28, 50, 129–132; 359/359, 361, 589; 372/19, 43–46

(56) References Cited

U.S. PATENT DOCUMENTS

| | | | | |
|---|---|---|---|---|
| 4,087,159 A | | 5/1978 | Ulrich | 385/131 |
| 4,689,797 A | * | 8/1987 | Olshansky | 372/45 |
| 5,480,722 A | * | 1/1996 | Tomonaga et al. | 359/361 |
| 5,712,937 A | * | 1/1998 | Asawa et al. | 385/12 |
| 5,796,891 A | * | 8/1998 | Poustie et al. | 385/50 |
| 6,148,132 A | * | 11/2000 | Hamamoto | 385/131 |
| 6,222,960 B1 | * | 4/2001 | Stensland et al. | 385/28 |

FOREIGN PATENT DOCUMENTS

JP         6-235833         8/1994

OTHER PUBLICATIONS

K. Hamamoto et al., "Single–transverse–mode Active–MMI 1.5μm–InGaAsP Buried–hetero Laser Diode", Addendum and Postdeadline Papers, ECIO '97, 8$^{TH}$ European Conference on Integrated Optics and Technical Exhibition, Apr. 1997, Royal Institute of Technology, Stockholm, Sweden, pp. 2–5.

K. Kato et al., "A High–Efficiency 50 GHz InGaAs Multimode Waveguide Photodetector", IEEE Journal of Quantum Electronics, vol. 28, No. 12, Dec. 1992, pp. 2728–2735.

L.B. Soldano et al., "Optical Multi–Mode Interference Devices Based on Self–Imaging: Principles and Applications", pp. 615–627, Journal of Lightwave Technology, vol. 13, No. 4, Apr. 1995.

* cited by examiner

*Primary Examiner*—Thong Nguyen
(74) *Attorney, Agent, or Firm*—Young & Thompson

(57) ABSTRACT

A semiconductor waveguide photodetector having a high receiving efficiency has single mode light transmitted as the incident light signal. The semiconductor waveguide photodetector includes a 1×1 multi mode interference (MMI) light waveguide region, and two single mode waveguide regions, each of which is connected at an end to the multi mode region. The length of the multi mode waveguide region is about 100 μm and the lengths of the single mode waveguide region are about 10 μm. The width of multimode waveguide region is 6 μm and those of single mode waveguide regions are 1.5 μm. The semiconductor waveguide photodetector detects and filters the incident light in the same material within the multiple mode region.

6 Claims, 3 Drawing Sheets

SEMICONDUCTOR WAVEGUIDE PHOTODETECTOR

BACKGROUND OF THE INVENTION

1. Field of the Invention

The present invention relates to a semiconductor waveguide photodetector with high detection sensitivity, which acts also as a filter applicable to the wavelength division multiple communication.

2. Description of the Prior Art

Recently, the optical fiber communication technology has been progressing as one of the technologies for large capacity and high speed transmission. Particularly, the semiconductor photodetector, amongst various optical devices supporting optical communication technology, are of great interest, because it is one of the key devices for implementing long distance communication, which receives directly the transmitted signal and converts the light signal to electrical signal.

There are some variations in the semiconductor photodetector. Particularly, the semiconductor waveguide photodetector is characterized in that it is packaged in a package similar to a semiconductor laser and it is integrated easily with other waveguide optical devices or passive waveguides.

Generally, the light receiving region is designed as a multimode waveguide for improving the receiving efficiency of light signal. Such a multimode waveguide for the semiconductor waveguide photodetector is reported, for example, in IEEE Journal of Quantum Electronics Vol. 28 No. 12, 1992, p2728 to p2735, by K. Kato.

If the only purpose is to receive optical signal, a single mode waveguide is not necessary. However, it is desirable that the waveguide photodetector behaves also as a filter as well as a detector. In case of the wavelength division multiple communication, a semiconductor photodetector is provided with the filtering function which passes the wavelength longer than the sensitive wavelength of the photodetector and absorbs the wavelength within the sensitive band. The above-mentioned function requires a single mode waveguide which propagates single mode light.

As described above, it is preferable that the light receiving region be designed as a multimode waveguide in view of the receiving efficiency of light signal. On the other hand, a single mode waveguide is required in order to obtain the filtering function for the wavelength division multiple communication. These two conditions are contradictory.

SUMMARY OF THE INVENTION

Therefore, an object of the present invention is to provide a semiconductor photodetector with higher light receiving efficiency, which has also a function of optical filter.

In accordance with the present invention, there is provided a semiconductor photodetector which outputs single mode light, which comprises a light waveguide structure including a multi mode waveguide region.

The multi mode waveguide region may be a 1×1 multi mode interference light waveguide.

The semiconductor waveguide photodetector may comprise a multi mode waveguide region; and a couple of single mode waveguide regions, each of which is connected to an each end of the multi mode waveguide region.

The width of the multi mode waveguide region is made wider than the width of the single mode waveguide regions.

The above-mentioned structure behaves as a multi mode waveguide light receiving region for the received light and behaves as a single mode waveguide optical filter for the transmitted light.

As described above, the semiconductor waveguide photodetector of the present invention is highly sensitive, because the main light receiving region is a multi mode waveguide. Further, the multi mode waveguide is the 1×1 multi mode interference (MMI) waveguide. Therefore, the semiconductor waveguide photodetector functions also as a filter suitable for the waveguide division multiple communication.

PREFERRED EMBODIMENT OF THE INVENTION

Figure 1:
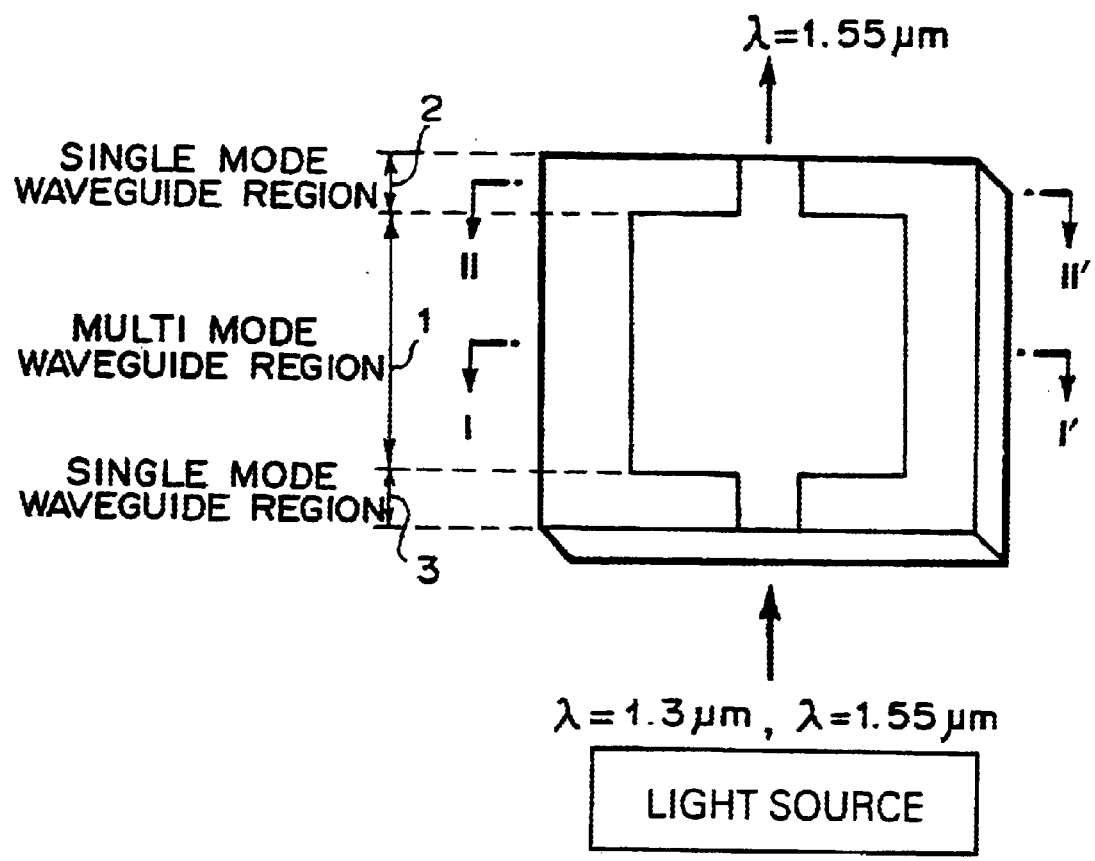
FIG. 1 is a perspective illustration of the semiconductor waveguide photodetector of the present invention.

Referring to the drawings, the embodiment of the present invention is explained in detail.

Figure 2A:
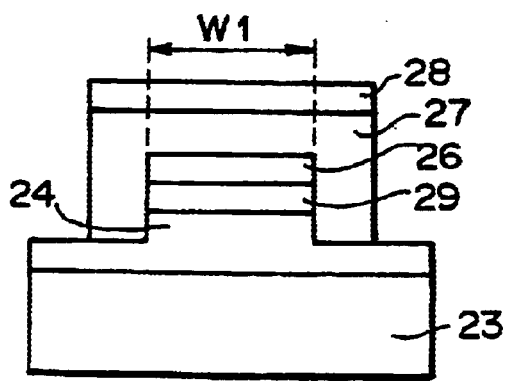
FIG. 2A is a cross sectional view taken on line I—I' of the semiconductor waveguide photodetector of the present invention as shown in FIG. 1.
Figure 2B:
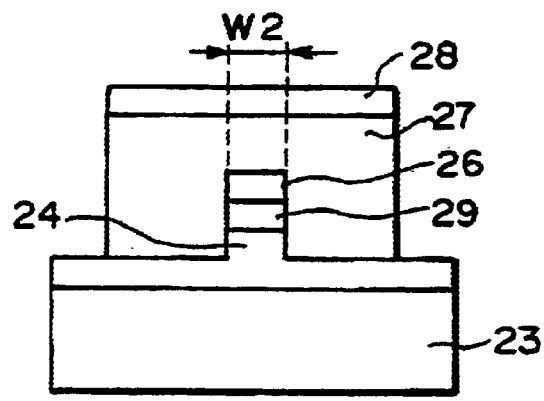
FIG. 2B is a cross sectional view taken on line II—II' of the semiconductor waveguide photodetector of the present invention as shown in FIG. 1.

As shown in FIG. 1, for example, the photodetector of the present invention absorbs 1.3 $\mu$m band light and passes through 1.55 $\mu$m band light, if wavelength division multiple signal composed of 1.3 $\mu$m band light and 1.55 $\mu$m band light is incident. The semiconductor waveguide photodetector comprises multi mode waveguide region 1, and single mode waveguide regions 2 and 3, each of which is connected with an end of the multi mode region 1. The length of the multi mode waveguide region 1 is about 100 $\mu$m and the length of the single mode waveguide regions 2 and 3 is about 10 $\mu$m. Accordingly, the length of the whole device is about 120 $\mu$m. Multi mode waveguide region 1 is designed as a 1×1 multi mode interference (MMI) light waveguide. FIG. 2A is a cross sectional view taken on line I—I' to show the layered structure of the multi mode wave guide region, and FIG. 2B is a cross sectional view taken on line II—II' to show the layered structure of the single mode wave guide region. Both of the layer structures are the same except the widths of the waveguides. The width W1 of multimode waveguide region 1 is 6 $\mu$m and those of single mode waveguide regions 2 and 3 are 1.5 $\mu$m.

Figure 3:
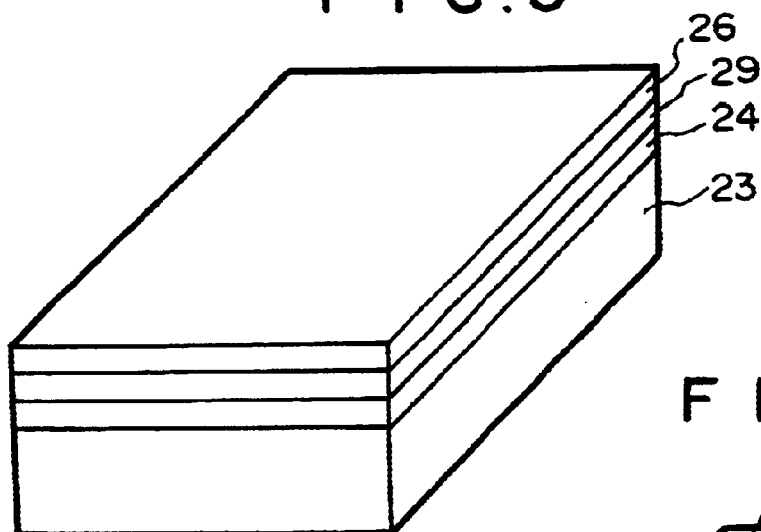
FIG. 3 is an illustration for explaining the first step of the manufacturing of the semiconductor waveguide photodetector of the present invention as shown in FIG. 1.

Next, referring to FIG. 3 to FIG. 7, the fabrication method of the semiconductor waveguide photodetector of the present invention is explained. As shown in FIG. 3, n-InP buffer layer 24 (about 200 nm thickness), 1.4 μm composition InGaAsP layer 29 (about 100 nm thickness), and p-InP cladding layer 26 (about 200 nm thickness) are grown sequentially on n-InP substrate 23, by metal organic vapor phase epitaxy (MOVPE).

Figure 4:
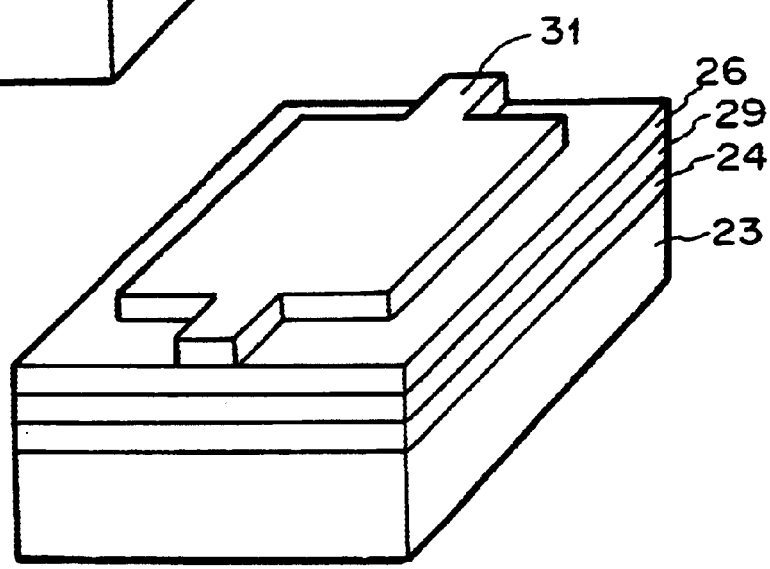
FIG. 4 is an illustration for explaining the second step of the manufacturing of the semiconductor waveguide photodetector of the present invention as shown in FIG. 1.
Figure 5:
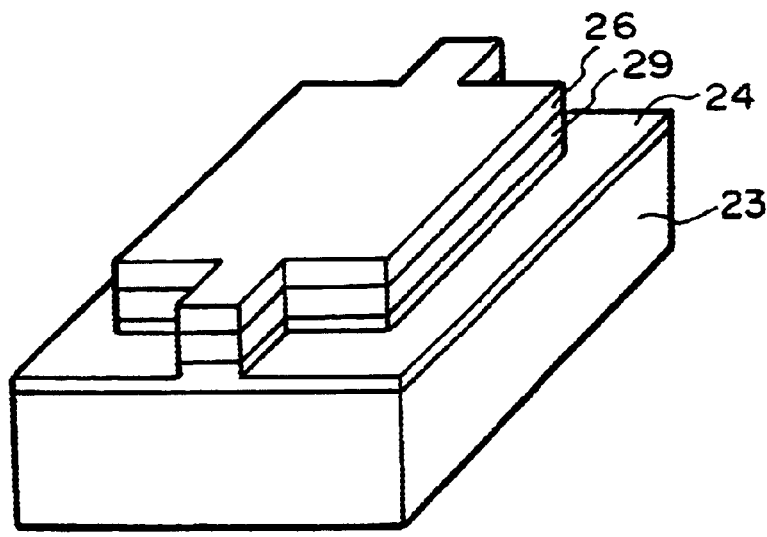
FIG. 5 is an illustration for explaining the third step of the manufacturing of the semiconductor waveguide photodetector of the present invention as shown in FIG. 1.

Then, as shown in FIG. 4, mask 31 for etching is formed on p-InP cladding layer 26 by using conventional photolithography. Then, as shown in FIG. 5, the unmasked part of p-InP cladding region 26, 1.4 μm composition InGaAsP layer 29, and n-InP buffer layer 24 are etched by using the reactive ion etching (RIE).

Figure 6:
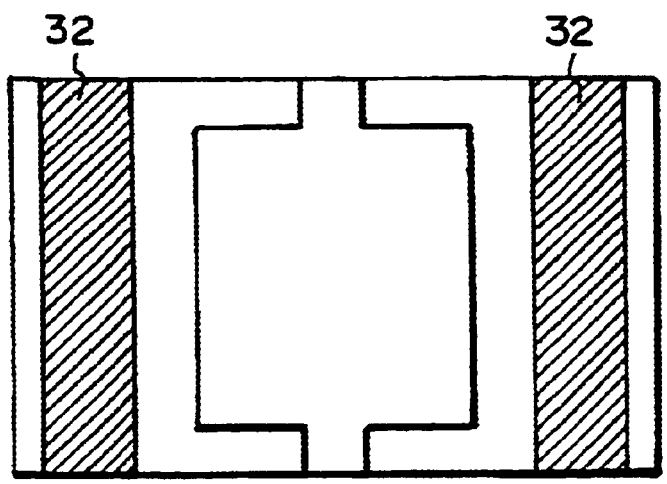
FIG. 6 is an illustration for explaining the fourth step of the manufacturing of the semiconductor waveguide photodetector of the present invention as shown in FIG. 1.
Figure 7:
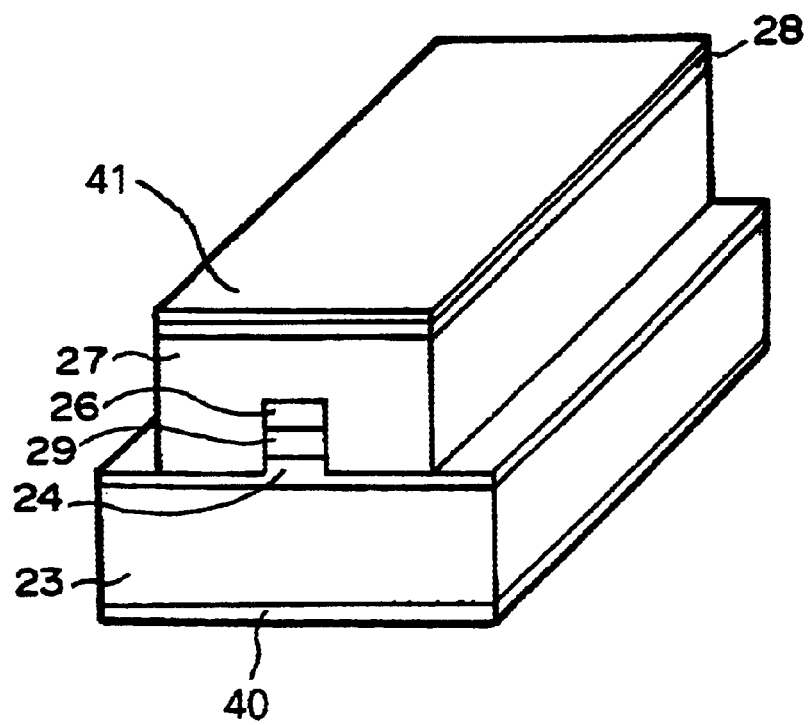
FIG. 7 is an illustration for explaining the fifth step of the manufacturing of the semiconductor waveguide photodetector of the present invention as shown in FIG. 1.

Next, after depositing $SiO_2$ on the whole surface by using the conventional thermal chemical vapor deposition (CVD), the $SiO_2$ is etched to form mask 32 for depositing a burying layer 27 which surround mesa stripe by using selective epitaxy, as shown in FIG. 6. Then, as shown in FIG. 7, p-InP burying layer 27 (about 2 μm thickness) and p-InGaAs capping layer 28 (about 200 μm thickness) are grown by using MOVPE.

Then, the backside of the device is polished, the substrate electrode 40 and the surface electrode 41 are metalized by conventional sputtering, and finally the anti-reflection coating layer is deposited on the cleaved facets of the mesa stripe.

The semiconductor waveguide photodetector of the present invention comprises a multi mode waveguide region 1, as shown in FIG. 1. The multi mode waveguide region 1 is designed to behave as a 1×1 MMI light waveguide.

In the conventional technology, a narrow waveguide with about 1.5 μm width along the whole waveguide is required to transmit single mode light.

However, 1×1 MMI light waveguide can transmit single mode light, even if it is three times or more wider than the conventional single mode waveguide, according to the principle of multi mode interference. Thus, the single mode light can be transmitted, though the main light receiving region is made of the above-mentioned multimode waveguide which is highly sensitive. Accordingly, the semiconductor waveguide photodetector functions as a filter suitable for the waveguide division multiple communication.

The waveguide of the present invention confines strongly both the TE mode and the TM mode. Therefore, the light receiving sensitivity is polarization independent. Further, it is suitable for the integrated optical devices, because its structure is simple.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

For example, the present invention is applicable for the other layer structure instead of the buried structure of the present invention. The wavelength may be 1.3 μm or in the near infrared or visible region, without limiting it to 1.55 μm.

The method of epitaxy may be MBE, instead of MOVPE and the method of forming the mesa may be wet etching, instead of RIE.

What is claimed is:

1. A photodetector for selectively passing and absorbing light based on wavelength, comprising:

a substrate;

a combined waveguide including a 1×1 multi mode interference (MMI) waveguide on said substrate, a first single mode waveguide connected with an input end of said MMI waveguide and formed on said substrate and a second single mode waveguide connected with an output end of said MMI waveguide and formed on said substrate, and a substrate electrode, wherein a light of wavelength multiplexed signal having at least two wavelength components is incident onto the first single mode waveguide, transmitted therethrough and introduced into the MMI waveguide, and, the combined waveguide is constructed so that a composition in wavelength of a core layer of the MMI waveguide is shorter in wavelength than a first of the wavelength components which is transmitted through the MMI waveguide to be allowed to pass through the second single mode waveguide as single mode, while the composition in wavelength of the core layer is longer in wavelength than a second of the wavelength components which is absorbed by the MMI waveguide; and wherein said second of the wavelength components absorbed by the MMI waveguide is converted to an electrical output signal through said substrate electrode.

2. A photodetector for selectively passing and absorbing light based on wavelength, comprising:

a substrate; and a combined waveguide formed on said substrate, said combined waveguide including a multi mode waveguide region which is designed as a 1×1 multi mode interference (MMI) waveguide, a first single mode waveguide region a first end of which is connected to a first end of said multi mode waveguide region and a second single mode waveguide region a first end of which is connected to a second end of said multi mode waveguide region, wherein a light containing at least two wavelength components is incident on a second end of said first single mode waveguide region, transmitted therethrough and introduced into the multi mode waveguide region, a first of said wavelength components introduced into said multi mode waveguide region through the first end of said multi mode waveguide region is absorbed by said multi mode waveguide region, and, a second of said wavelength components passes through said multi mode waveguide region, introduced into said second single mode waveguide region through the second end of said multi mode waveguide region, transmitted as single mode through said second single mode waveguide region and emitted therefrom through a second end of said second single mode waveguide region; and wherein the photodetector produces an electrical output signal converted from the first of said wavelength components absorbed in the MMI waveguide.

3. The photodetector of claim 2, further comprising a substrate electrode for producing the electrical output signal.

4. The photodetector of claim 2, wherein a composition in wavelength of a core layer of the MMI waveguide is shorter in wavelength than the second of the wavelength components which is transmitted through the MMI waveguide, while the composition in wavelength of the core layer is longer in wavelength than the first of the wavelength components which is absorbed by the MMI waveguide.

5. A photodetector for selectively passing and absorbing light based on wavelength, comprising:
   a substrate; and
   a combined waveguide formed on said substrate, said combined waveguide including a multimode waveguide region, a first single mode waveguide region a first end of which is connected to a first end of said multimode waveguide region and a second single mode waveguide region a first end of which is connected to a second end of said multimode waveguide region,
   wherein said multimode waveguide region is designed as a 1×1 multimode interference (MMI) waveguide, so that a light of wavelength multiplexed signal having at least two wavelength components is incident on a second end of said first single mode waveguide region, transmitted therethrough and introduced into the MMI waveguide, and the combined waveguide is constructed so that a composition in wavelength of a core layer of the MMI waveguide is shorter in wavelength than a first of the wavelength components which is transmitted through the MMI waveguide to be allowed to pass through the second single mode waveguide as single mode and emitted therefrom through a second end of said second single mode waveguide region, while the composition in wavelength of the core layer is longer in wavelength than a second of the wavelength components which is absorbed by the MMI waveguide.

6. The photodetector of claim 5, wherein the photodetector produces an electrical output signal converted from the second of the wavelength components absorbed by the MMI waveguide.

* * * * *